3,313,704
PITUITARY EXTRACT
Choh H. Li, Berkeley, Calif., assignor to The Regents of the University of California, Berkeley, Calif., a corporation of California
No Drawing. Filed Nov. 5, 1964, Ser. No. 409,313
2 Claims. (Cl. 167—74)

This invention relates to a process of obtaining products of glandular origin, more particularly a process of obtaining biologically active products from pituitary glands.

Processes of obtaining such biologically active products are known in the art. However, the paucity and high cost of glandular source material and increasing demands for useful end products of high activity spur investigators in the area to seek, develop and perfect more efficient and less-costly processes. Improvements are noticeably elusive because of the complex systems involved in the glandular production of biologically active substances. Especially is this true of improved methods of obtaining pituitary products of large molecular size such as polypeptides and those of protein-like nature. Nevertheless, the present efforts have succeeded in perfecting a more efficient process which yields final products of high biological quality.

Hence, the present invention provides an improved process of obtaining adrenocorticotropin (ACTH) from mammalian pituitaries. The process comprises a sequence of steps. Generally described, the steps are those of preparing an acidified acetone extract of the pituitaries, salting out an active fraction therefrom, dialyzing the active fraction in an aqueous medium, separating water from the dialyzed active fraction, and chromatographing the active fraction on carboxymethylcellulose.

The starting material in the improved process is mammalian pituitary gland which means porcine, bovine and ovine gland. The whole gland or the anterior lobe thereof can be used in either fresh or frozen form. The preferred starting material is ovine whole pituitary, especially frozen whole pituitary from sheep.

The glandular material is minced and extracted with an acidified aqueous acetone solution. The insoluble residue is separated and re-extracted with more of such solution. The combined solubles are mixed with excess acetone to yield a precipitate, which is washed with acetone and dried in vacuo to a powder.

The dry powder is dissolved in water, and the aqueous solution is adjusted as to pH. Saturated salt solution is added to form a first precipitate, which is separated. The remaining soluble portion is brought to saturation with salt, and the resultant precipitate is dissolved in water and dialyzed against running water to remove salt. Water is volatilized from the dialyzed solution, preferably by freezing and drying in vacuo from the frozen state. A preliminary adrenocorticotropic product is recovered for further processing.

The preliminary product is subjected to chromatography over carboxymethylcellulose previously equilibrated with ammonium acetate buffer. Gradient elution with respect to concentration and pH is carried out, utilizing ammonium acetate buffer. Fractions of eluate are collected and determinations of optical density to ultraviolet light are made. As various separate polypeptides and protein-like products are removed in consecutive fractional eluates the relative optical densities increase to peak values and decrease therefrom. Intermittent eluates with such increased and decreased densities are combined, water and buffer are volatilized therefrom, and the respective products are recovered in dry form. In the inventive process two sequential continuous linear gradients are used, to ammonium acetate of 0.1 M, pH 6.7 and 0.2 M, pH 6.7, respectively. A terminal peak is obtained with the gradient ammonium acetate buffer to 0.2 molarity and pH 6.7. This peak yields adrenocorticotropin of high quality in an increased amount. Assays for biological activity show high content of steroidogenic activity and freedom from other active principles of the source material other than some inherent melanocyte stimulating activity.

Further procedures such as rechromatography on carboxymethylcellulose, gel filtration, electrophoretic mobility, and counter-current distribution show that the final product is substantially homogenous.

How to perform the improved process and the best mode contemplated of carrying out the invention are set forth hereinafter but such are not to be construed as limiting.

Frozen whole pituitary glands of sheep are minced and extracted with acidified aqueous acetone; 1 part by weight of glands to 4 parts by volume of extracting solution. The latter solution is prepared by mixing 500 mls. of purified water, 4000 mls. of acetone, and 100 mls. of concentrated hydrochloric acid. The extraction mixture is stirred during about 1 hour and the whole is filtered to separate insoluble and soluble portions. The insoluble portion is re-extracted with 2000 mls. of 80% acetone–20% purified water. The insoluble material is separated. The extracts are combined and poured into 30 liters of acetone (about 4° C.). A precipitate is obtained. It is washed with excess acetone, recovered, and dried in vacuo at room temperature. About 35 gms. of dry powder are obtained per kg. of gland.

Approximately 20 gms. such dry powder is dissolved in 940 mls. of purified water and adjusted with a mineral acid to pH about 3. Sixty mls. of saturated aqueous sodium chloride solution are added to salt out a first precipitate, which is separated. The soluble portion is brought to saturation with sodium chloride. A second salted-out precipitate is separated and dissolved in about 100 mls. of purified water. The solution is dialyzed (20/100, Visking cellophane tube) against running water until salt free. Thereafter the dialyzed solution is frozen and dried in vacuum from the frozen state. The yield of preliminary product is about 4 gms.

Two grams of such preliminary product was applied to a carboxymethylcellulose column (60 cm. x 1 cm.) previously equilibrated with 0.01 M ammonium acetate buffer of pH 4.6. Elution was started with buffer of the same molarity and pH. At a flow rate of about 100 mls. per hour, 4 hold-up volumes of eluate were collected. Thereafter a continuous linear gradient to ammonium acetate of 0.1 M and pH 6.7 was started. Eluate fractions of 4 ml. were collected. Absorbancies by the eluates of ultraviolet light of about 278 m$\mu$ were determined to follow the course of polypeptide elution. After several peaks had been eluted, absorbancy began to return to the baseline value. At this time a continuous linear gradient to ammonium acetate of 0.2 M and pH 6.7 was started. Eluate fractions of 4 ml. were again collected. The next peak is at about tube 160. The material contained therein is separately processed. The next peak at about tube 210 contains some adrenocorticotropic substance which is separately processed.

Subsequently a terminal peak comprised eluates in about tube 220 through about tube 240. The eluates corresponding to this peak were combined, frozen and freed of buffer and water by drying in vacuo from the frozen state. About 30 mgs. of dry powder was obtained. The powder showed substantial homogeneity by disc electrophoresis in polyacrylamide gels. Electrophoresis was performed at pH 4.5 ($\beta$-alanine acetate buffer, 0.35 M) for 30 minutes at 220 v., 12 milliamperes per tube (7 x 0.5 cm.) and the gels were stained with amido black. Steroidogenic activity was determined by the method of Saffran and Schally, Endocrinology, 56

(1955) 523, and Rerup, Acta Endocrin, 29 (1958) 83. Melanocyte stimulating activity was determined by the method of Shizume, Lerher and Fitzpatrick, Endocrinology, 54 (1954) 553. The respective potencies were 180 units of adrenocorticotropic activity per mg. and $1 \times 10^8$ units of melanocyte stimulating activity per gm. A sample of the dry powder was rechromatographed as before over carboxymethylcellulose and retained its chromatographic identity. The recovered rechromatographed product moved as a single symmetrical band when subjected to zone electrophoresis on starch for 30 hours in 0.1 M $Na_2CO_3$ with a potential gradient of 5 v./gm. at 5° C. A sample of the recovered rechromatographed product was distributed for 120 transfers in a countercurrent apparatus in the solvent system sec.-butanol/0.1% trichloracetic acid (1:1, by volume) and showed a single peak with a partition coefficient of $K=0.29$.

What is claimed is:
1. A process of obtaining adrenocorticotropin which comprises:
   (1) extracting mammalian pituitary glands with acidified aqueous acetone and recovering the extract;
   (2) mixing the recovered extract with excess acetone to precipitate an insoluble product;
   (3) preparing an aqueous solution of the insoluble product at about pH 3 and adding salt to saturate the aqueous solution and form a precipitate;
   (4) preparing an aqueous solution of the precipitate and dialyzing the solution against water;
   (5) recovering a preliminary adrenocorticotropic product from the dialyzed solution by volatilizing water therefrom in vacuo;
   (6) dissolving the recovered product in an aqueous solution of ammonium acetate of 0.01 M and pH 4.6 and chromatographing the solution on carboxymethylcellulose;
   (7) fractionally eluting absorbed material from the carboxymethylcellulose with sequential continuous linear gradients to ammonium acetate of 0.1 M, pH 6.7 and 0.2 M, pH 6.7; and
   (8) recovering adrenocorticotropin from combined terminal fractional eluates in the continuous linear gradient to ammonium acetate of 0.2 M and pH 6.7 by volatilizing water and ammonium acetate therefrom in vacuo.

2. The process of claim 1 wherein the mammalian pituitary gland is whole sheep pituitary gland.

No references cited.

SAM ROSEN, *Primary Examiner.*

L. RANDALL, *Assistant Examiner.*